United States Patent
Eutsler et al.

(10) Patent No.: US 12,361,778 B1
(45) Date of Patent: Jul. 15, 2025

(54) GENERATION AND VALIDATION OF NON-FUNGIBLE TOKENS LINKED WITH PHYSICAL ENVIRONMENTS

(71) Applicant: Wells Fargo Bank, N.A., San Francisco, CA (US)

(72) Inventors: Nathaniel C. Eutsler, San Francisco, CA (US); Matthew Mullin Shepherd, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 235 days.

(21) Appl. No.: 17/955,066

(22) Filed: Sep. 28, 2022

(51) Int. Cl.
 *G07C 9/27* (2020.01)
 *H04L 9/14* (2006.01)

(52) U.S. Cl.
 CPC . *G07C 9/27* (2020.01); *H04L 9/14* (2013.01)

(58) Field of Classification Search
 CPC .................................. G07C 9/27; H04L 9/14
 USPC ......................................................... 713/182
 See application file for complete search history.

(56) References Cited

U.S. PATENT DOCUMENTS

| | | | |
|---|---|---|---|
| 2 A | 7/1836 | Goulding | |
| 11,037,211 B2 | 6/2021 | Preston et al. | |
| 11,154,783 B1 | 10/2021 | Koch et al. | |
| 11,562,451 B1 | 1/2023 | Kozlowski | |
| 11,836,690 B1 | 12/2023 | Stroke et al. | |
| 2009/0324025 A1* | 12/2009 | Camp, Jr. ................ | G07C 9/20 |
| | | | 382/218 |
| 2016/0371776 A1 | 12/2016 | Sato | |
| 2020/0005284 A1 | 1/2020 | Vijayan | |
| 2020/0322154 A1 | 10/2020 | Konda et al. | |
| 2020/0342539 A1 | 10/2020 | Doney | |
| 2020/0364373 A1 | 11/2020 | Huang et al. | |

(Continued)

FOREIGN PATENT DOCUMENTS

| | | |
|---|---|---|
| CN | 113706175 | 11/2021 |
| EP | 3 540 662 A1 | 9/2019 |

(Continued)

OTHER PUBLICATIONS

Investopedia, Blockchain Explained, Sep. 5, 2021, https://web.archive.org/web/20210905101727/https://www.investopedia.com/terms/b/blockchain.asp (Year: 2021).*

(Continued)

*Primary Examiner* — Zi Ye
(74) *Attorney, Agent, or Firm* — Foley & Lardner LLP

(57) ABSTRACT

An aspect can include obtaining, from a device of a user, location data, obtaining, from the device in response to a determination that the location parameter identifies a physical location of a physical environment, a public key of the user, generating, based on the public key and a private key of the user, an NFT linked with the user and the physical environment, determining, in response to a determination that the device satisfies a distance threshold to an entry controller at the physical location, that the NFT and the public key are compatible with a control structure of a smart contract, and transmitting, in response to the determination that that the NFT and the public key are compatible with the control structure of the smart contract, an instruction based on the NFT to modify operation of the entry controller to permit entry to the physical location.

16 Claims, 11 Drawing Sheets

(56) References Cited

U.S. PATENT DOCUMENTS

| | | |
|---|---|---|
| 2021/0004739 A1 | 1/2021 | Gill et al. |
| 2021/0065293 A1 | 3/2021 | Sigler et al. |
| 2021/0097508 A1 | 4/2021 | Papanikolas |
| 2021/0133700 A1 | 5/2021 | Williams et al. |
| 2021/0150626 A1 | 5/2021 | Robotham |
| 2021/0248594 A1 | 8/2021 | Yantis et al. |
| 2021/0281410 A1 | 9/2021 | Hain |
| 2021/0326862 A1 | 10/2021 | Yantis et al. |
| 2021/0374791 A1 | 12/2021 | Kim |
| 2022/0010316 A1 | 1/2022 | Novick et al. |
| 2022/0027902 A1 | 1/2022 | Vandenberg et al. |
| 2022/0058630 A1 | 2/2022 | Yantis et al. |
| 2022/0058633 A1 | 2/2022 | Yantis et al. |
| 2022/0075845 A1 | 3/2022 | Bowen et al. |
| 2022/0101316 A1 | 3/2022 | Cramer |
| 2022/0222364 A1 | 7/2022 | Roberts et al. |
| 2023/0011621 A1 | 1/2023 | Jakobsson et al. |
| 2023/0034169 A1* | 2/2023 | Ferenczi ............... H04L 9/0894 |
| 2023/0045071 A1 | 2/2023 | Kalaldeh et al. |
| 2023/0088936 A1 | 3/2023 | Chalkley et al. |
| 2023/0102889 A1 | 3/2023 | Keiter et al. |
| 2023/0114684 A1 | 4/2023 | Jakobsson et al. |
| 2023/0119641 A1 | 4/2023 | Meyers et al. |
| 2023/0135947 A1 | 5/2023 | Barhudarian et al. |
| 2023/0137867 A1 | 5/2023 | Walters et al. |
| 2023/0139878 A1 | 5/2023 | Clark et al. |
| 2023/0315819 A1 | 10/2023 | Guy et al. |
| 2023/0316280 A1 | 10/2023 | Sardari et al. |
| 2023/0351347 A1 | 11/2023 | Damrow |
| 2023/0368184 A1 | 11/2023 | Polasa et al. |
| 2024/0012915 A1 | 1/2024 | Andon et al. |
| 2024/0020624 A1 | 1/2024 | Williams et al. |
| 2024/0031153 A1* | 1/2024 | Dravneek ........... G06Q 20/3821 |
| 2024/0070660 A1 | 2/2024 | Milne et al. |
| 2024/0104521 A1 | 3/2024 | Azgad-Tromer et al. |

FOREIGN PATENT DOCUMENTS

| | | |
|---|---|---|
| KR | 2196001 B1 | 12/2020 |
| WO | WO2021041746 A1 | 8/2020 |
| WO | WO-2023/034423 A1 | 3/2023 |

OTHER PUBLICATIONS

Dietrich et al., Classification Model of Supply Chain Events Regarding Their Transferability to Blockchain Technology.

Globe Newswire, "The Stoned Ape Crew NFT Evolution is Live!," (Jan. 26, 2022), https://www.globenewswire.com/en/news-release/2022/01/26/2373679/0/en/The-Stoned-Ape-Crew-NFT-Evolution-is-Live.html, pp. 1-4.

Gupta et al., "NFTs and the Cryptoverse," (Sep. 25, 2021), https://www.cryptechie.com/p/nft, pp. 1-23.

Ismail et al., TRABAC: A Tokenized Role-Attribute Based Access Control using Smart Contract for Supply Chain Applications.

Johnson et al., Creating Generative Art NFTs from Genomic Data.

La Fountain et al., "Non-Fungible Tokens, Libraries, and Publishers," (Jul./Aug. 2021), https://www.infotoday.com/OnlineSearcher/Articles/Features/NonFungible-Tokens-Libraries-and-Publishers-147856.shtml, pp. 1-5.

Raza et al., "Wells Fargo to Launch Digital Asset for Internal Transactions," (Sep. 18, 2019), https://insidebitcoins.com/news/wells-fargo-to-launch-digital-asset-for-internal-transactions, pp. 1-4.

Tahtacioglu et al., NFT with Chainlink Oracle—Blockchain Roadmap.

XHashtag, "Introducing #Selena—The First Liquid NFT Collection on Solana," Sep. 22, 2021, downloaded Sep. 13, 2022, https://medium.com/xhashtag/introducing-selena-the-first-liquid-nft-collection-on-solana-da568f6311d5.

Murray, Michael D. "N T ownership and copyrights." Ind. L. Rev. 56 (2022): 367. (Year: 2022).

* cited by examiner

US 12,361,778 B1

GENERATION AND VALIDATION OF NON-FUNGIBLE TOKENS LINKED WITH PHYSICAL ENVIRONMENTS

TECHNICAL FIELD

The present implementations relate generally to electronic content delivery, and more particularly to generation and validation of non-fungible tokens (NFTs) linked with physical environments.

INTRODUCTION

Secure movement to various premises can be time consuming due to delays introduced by authentication and authorization processes. As demands for seamless point-to-point movement increase, rapid and scalable issuance and exercise of secure access authority is increasingly desired.

SUMMARY

Aspects of this technical solution are directed to generating one or more NFTs based on satisfaction of various conditions. An NFT may be "earned" rather than purchased when an NFT is created in response to satisfaction of a particular condition or prerequisite for creation of the NFT. A particular user linked with a particular user device can be linked with the earned NFT in response to a parameter of the user device satisfying the condition or prerequisite. Conditions and prerequisites can be based on a physical environment, and can include, for example, a particular location or geolocation. Conditions and prerequisites can also be based on parameters linked with a user or a user device. For example, a particular user can earn an NFT associated with a particular physical booth at a trade conference by moving with the user device to a location within a predetermined distance from or within a geofence corresponding to the booth. The user account linked with the user device can then receive an earned NFT created or assigned to the particular user in response to the user device of that user satisfying the location condition of proximity to the booth. A user can obtain multiple earned NFTs, and can be authorized to perform one or more actions based on possession or one or more particular earned NFTs. For example, a user can be authorized to actuate a smart lock restricting access to a demo room of a trade conference based on possession of a particular number of earned NFTs from multiple booths. For example, a user can be authorized to actuate a smart lock restricting access to a vendor room of a trade conference based on possession of a particular number of earned NFTs from booths of that vendor over one year or multiple years of the trade show. Earned NFTs are not limited to physical locations, and can be earned based on characteristics or parameters in addition to location or in place of location. Earned NFTs are not limited to authorization with respect to physical locations, and can include authorization to virtual locations, virtual goods and services independent of location, or physical goods and services independent of location, for example. Thus, a technological solution for generation and validation of NFTs linked with physical environments is provided.

At least one aspect is directed to a system to generate and validate non-fungible tokens (NFTs) linked with physical environments. The system can include memory and one or more processors. The system can obtain, from a device corresponding to a user, a parameter including location data. The system can obtain, from the device in response to a determination that the parameter identifies a physical location that corresponds to a physical environment, a public key of the user. The system can generate, based on the public key and a private key of the user, a non-fungible token (NFT) linked with the user and the physical environment. The system can determine, in response to a determination that the device satisfies a distance threshold to an entry controller at the physical environment, that the NFT and the public key are compatible with a control structure of a smart contract. The system can transmit, in response to the determination that that the NFT and the public key are compatible with the control structure of the smart contract, an instruction based on the NFT to modify operation of the entry controller to permit entry to the physical environment.

At least one aspect is directed to a method of generation and validation of non-fungible tokens (NFTs) linked with physical environments, the method can include obtaining, from a device corresponding to a user, a parameter including location data. The method can include obtaining, from the device in response to a determination that the parameter identifies a physical location that corresponds to a physical environment, a public key of the user. The method can include generating, based on the public key and a private key of the user, a non-fungible token (NFT) linked with the user and the physical environment. The method can include determining, in response to a determination that the device satisfies a distance threshold to an entry controller at the physical environment, that the NFT and the public key are compatible with a control structure of a smart contract. The method can include transmitting, in response to the determination that that the NFT and the public key are compatible with the control structure of the smart contract, an instruction based on the NFT to modify operation of the entry controller to permit entry to the physical environment.

At least one aspect is directed to a computer readable medium including one or more instructions stored thereon and executable by a processor. The processor can obtain, by the processor from a device corresponding to a user, a parameter including location data. The processor can obtain, by the processor from the device in response to a determination that the location parameter identifies a physical location that corresponds to a physical environment, a public key of the user. The processor can generate, by the processor based on the public key and a private key of the user, a non-fungible token (NFT) linked with the user and the physical environment. The processor can determine, by the processor in response to a determination that the device satisfies a distance threshold to an entry controller at the physical environment, that the NFT and the public key are compatible with a control structure of a smart contract. The processor can transmit, by the processor in response to the determination that that the NFT and the public key are compatible with the control structure of the smart contract, an instruction based on the NFT to modify operation of the entry controller to permit entry to the physical environment.

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

DETAILED DESCRIPTION

Figure 1:
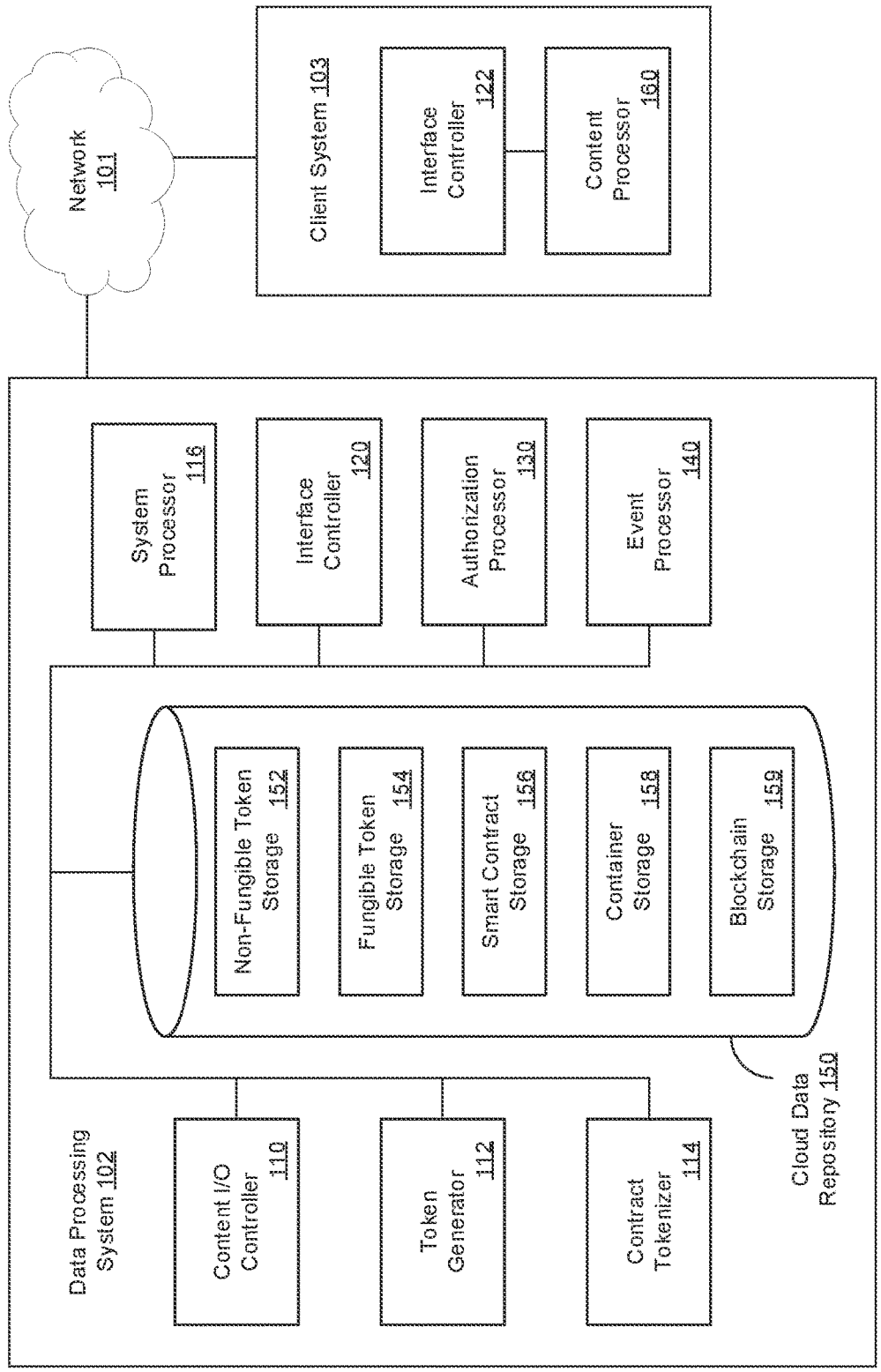
FIG. 1 illustrates a system in accordance with present implementations.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

This technical solution can include an architecture to generate or assign NFTs in response to satisfaction of a particular condition. The architecture can include a smart contract having a control structure to detect a state of a device corresponding to a particular user, and to detect satisfaction of a particular condition with respect to the state of the device. For example, the smart contract can detect a physical location of a device in response to receiving a location token including or corresponding to a physical location of a device. The location can correspond to one or more of a Global Positioning System (GPS) coordinate or elevation. The technical solution can include a smart contract having a control structure to generate an earned NFT corresponding to a particular satisfaction of a condition, including for example, proximity to or presence within a particular location or region. The technical solution can include a smart contract having a control structure to receive and store a plurality of earned NFTs corresponding to a particular user or particular entity. The smart contract can include or correspond to an earned NFT "wallet" with one or more cryptographic control structures to prevent unauthorized execution or transmission of an earned NFT linked with a particular user. The technical solution can include a content processor compatible with a particular smart contract or earned NFT to execute an operation based on the NFT. The content processor can be at least partially remote from a logical storage location of the earned NFT. For example, the content processor can be embedded in a smart door lock that can be actuated in response to detecting a location key corresponding to or based on a particular earned NFT and compatible with the smart door lock. Thus, the technical solution can provide a technical improvement of providing individualized and secure execution of content processor based on an earned NFT retained at a secure smart contract linked with a particular user.

FIG. 1 illustrates a system in accordance with present implementations. As illustrated by way of example in FIG. 1, an example system 100 can include a network 101, a data processing system 102, and a client system 103. The network 101 can be any type or form of network. The geographical scope of the network 101 can vary widely and the network 101 can be a body area network (BAN), a personal area network (PAN), a local-area network (LAN), e.g. Intranet, a metropolitan area network (MAN), a wide area network (WAN), or the Internet. The topology of the network 101 can be of any form and can include, e.g., any of the following: point-to-point, bus, star, ring, mesh, or tree. The network 101 can be an overlay network which is virtual and sits on top of one or more layers of other networks 101. The network 101 can be of any such network topology as known to those ordinarily skilled in the art capable of supporting the operations described herein. The network 101 can utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite can include application layer, transport layer, internet layer (including, e.g., IPv6), or the link layer. The network 101 can be a type of a broadcast network, a telecommunications network, a data communication network, or a computer network. The data processing system 102 can include a content input and output (I/O) controller 110, a token generator 112, a contract tokenizer 114, a system processor 116, an interface controller 120, an authorization processor 130, an event processor 140, and a cloud data repository 150. The client system 103 can include a computing system located remotely from the data processing system 102. The client system 103 can include an interface controller 122 and a content processor 160.

The content I/O controller 110 can obtain one or more content objects. The content I/O controller 110 can communicate with one or more external systems via the network 101, and can obtain one or more contents objects via the network 101. The content I/O controller 110 can generate content objects based on one or more output criteria that can be transmitted to a computing device, including, for example, the client system 103. The content I/O controller 110 can identify one or more characteristics of a content objet. A characteristic can include, for example, a data type, an output data type, an input data type, or any combination thereof. For example, the content I/O controller 110 can obtain and identify contents objects including video, audio, text, any media, executable programs, or any combination thereof. The content I/O controller 110 can transmit one or more of content objects or references or links with one or more content objects to the token generator 112.

The token generator 112 can generate one or more non-fungible tokens linked to particular content objects obtained from the content I/O controller 110. The token generator 112 can generate a token corresponding to a particular content object or content objects. The token generator 112 can obtain a preexisting token and can assign the preexisting token to a particular content object or content objects. The token generator 112 can generate a non-fungible token that is unique against all other tokens generated by the token generator 112 to identify content objects, a fungible token that can be generated or replicated an arbitrary number of times, and a semi-fungible token that can be generated or replicated a particular number of times below or meeting a particular replication threshold. One or more fungible tokens or semi-fungible tokens can, for example, be associated with a particular content object or the same content object. The token generator 112 can access the fungible token storage 154 to determine whether the replication threshold corresponding to a particular threshold is satisfied, and can block or forgo generation or replication of a token beyond or meeting the replication threshold in response to a determination that the replication threshold corresponding to a particular threshold is satisfied. The token generator 112 can transmit one or more of content objects or references or links with one or more content objects to the contract tokenizer 114, and can transmit one or more non-fungible tokens, fungible token, or semi-fungible tokens to the contract tokenizer 114.

The contract tokenizer 114 can generate one or more smart contracts that are executable to restrict output of one or more particular content objects based on one or more content objects. The system processor, for example, can execute smart contracts generated by the contract tokenizer 114. The contract tokenizer 114 can obtain one or more content objects and can generate a container corresponding to the content objects. For example, the contract tokenizer 114 can generate a container to encapsulate a plurality of content objects each associated with a particular content characteristic. The container can restrict access to the content objects within the container, by an encapsulation layer that, for example, encrypts all content objects within the container with a common encryption scheme. The encapsulation layer can control output of multiple content objects within the container by uniformly and concurrently decrypting the content objects according to the common encryption scheme. A content characteristic can include a type of output, a magnitude associated with the output, or any combination thereof, for example. For example, the content characteristic can include a periodic value increase in a metric of the content object, or can include a medic type associated with a media object. A media type can include, for example, video, audio, text, or any combination thereof. The contract tokenizer 114 can store one or more containers can encapsulating one or more content objects in the container storage 158.

The contract tokenizer 114 can generate a smart contract based on one or more tokens and containers. The contract tokenizer 114 can generate a smart contract including one or more executable instructions to restrict or transmit output of cone or more content objects encapsulated within a particular container. The contract tokenizer 114 can generate a smart contract that can conditionally transmit output of one or more of the content objects in response to detection of one or more tokens. The tokens can include one or more non-fungible token, fungible tokens, and semi-fungible tokens. The contract tokenizer 114 can store the smart contract to the smart contract storage 156, and can link a token to the smart contract. The contract tokenizer 114 can publish, post, or append, for example, the token linked to the smart contract to a blockchain, and can publish, post, or append, for example, one or more tokens corresponding to the smart contract to a blockchain.

The system processor 116 can execute one or more instructions associated with the system 100. The system processor 116 can include an electronic processor, an integrated circuit, or the like including one or more of digital logic, analog logic, digital sensors, analog sensors, communication buses, volatile memory, nonvolatile memory, and the like. The system processor 116 can include, but is not limited to, at least one microcontroller unit (MCU), microprocessor unit (MPU), central processing unit (CPU), graphics processing unit (GPU), physics processing unit (PPU), embedded controller (EC), or the like. The system processor 116 can include a memory operable to store or storing one or more instructions for operating components of the system processor 116 and operating components operably coupled to the system processor 116. The one or more instructions can include at least one of firmware, software, hardware, operating systems, embedded operating systems, and the like. The system processor 116 or the system 100 generally can include at least one communication bus controller to effect communication between the system processor 116 and the other elements of the system 100.

The interface controller 120 can link the data processing system 102 with one or more of the network 101 and the client system 103 by one more communication interfaces. A communication interface can include, for example, an application programming interface ("API") compatible with a particular component of the data processing system 102 or the data processing system 102. The communication interface can provide a particular communication protocol compatible with a particular component of the data processing system 102 and a particular component of the client system 103. The interface controller 120 can be compatible with particular content objects, and can be compatible with particular content delivery systems corresponding to particular content objects. For example, the interface controller 120 can be compatible with transmission of video content, audio content, or any combination thereof. For example, the interface controller 120 can be compatible with payment processing transmissions by a protocol compatible with payment processing latency and encryption structures.

The authorization processor 130 can validate one or more tokens against one or more smart contracts. The authorization processor 130 can obtain one or more tokens, and can compare one or more token to one or more tokens requested by a particular smart contract. The authorization processor 130 can detect whether a particular token is compatible with a particular smart contract by detecting whether a particular token matches a particular token characteristic associated with a particular smart contract. For example, the authorization processor 130 can detect that a token is compatible with a smart contract based on comparing a hash of the token with a hash included in the smart contract. The authorization processor 130 can generate an authorization indication based on one or more determinations, and can transmit the authorization indication to the event processor 140. The authorization processor 130 can, for example, provide a container or one or more content objects to the event processor 140, in response to the authorization indication, by decrypting the encapsulation layer of the container. The authorization processor 130 can, for example, execute the smart contract with the compatible tokens to retrieve a particular container for the smart contract, or a reference to the particular container, from the container storage 158.

The event processor 140 can execute one or more actions in response to an authorization indication generated by the authorization processor 140. The event processor 140 can, for example, provide output from particular content objects within a particular container, in response to receiving a container or reference to a container from the authorization processor 130.

The cloud data repository 150 can store data associated with the system 100. The cloud data repository 150 can include one or more hardware memory devices to store binary data, digital data, or the like. The cloud data repository 150 can include one or more electrical components, electronic components, programmable electronic components, reprogrammable electronic components, integrated circuits, semiconductor devices, flip flops, arithmetic units, or the like. The cloud data repository 150 can include at least one of a non-volatile memory device, a solid-state memory device, a flash memory device, and a NAND memory device. The cloud data repository 150 can include one or more addressable memory regions disposed on one or more physical memory arrays. A physical memory array can include a NAND gate array disposed on, for example, at least one of a particular semiconductor device, integrated circuit device, and printed circuit board device. The cloud data repository 150 can include a non-fungible token storage 152, a fungible token storage 154, a smart contract storage 156, a container storage 158, and a blockchain storage 159.

The non-fungible token storage 152 can store one or more NFTs and corresponding addresses for particular NFTs that indicate links with the corresponding NFT. The non-fungible token storage 152 can include NFTs associated with the data processing system 102 or any component thereof, the client system 103 or any component thereof, any content object, or any combination thereof. The fungible token storage 154 can store one or more fungible tokens and semi-fungible tokens. The fungible token storage 154 can store corresponding addresses for particular fungible tokens that indicate links with the corresponding fungible tokens, and can store corresponding addresses for particular semi-fungible tokens that indicate links with the corresponding semi-fungible tokens. The non-fungible token storage 152 can include fungible tokens and semi-fungible tokens associated with the data processing system 102 or any component thereof, the client system 103 or any component thereof, any content object, or any combination thereof.

The smart contract storage 156 can store one or more smart contracts and corresponding addresses for particular smart contracts that indicate links with the corresponding smart contracts. The container storage 158 can store one or more containers and their contained content objects and corresponding addresses for particular containers that indicate links with the corresponding containers. The blockchain storage 159 can store one or more blockchains linked to one or more smart contracts, tokens, containers, or content objects, by corresponding addresses for particular smart contracts, tokens, containers, or content objects that indicate links with a particular blockchain.

The interface controller 122 can link the client system 103 with one or more of the network 101 and the data processing system 102 by one or more communication interfaces. A communication interface can include, for example, an application programming interface ("API") compatible with a particular component of the data processing system 102 or the data processing system 102. The communication interface can provide a particular communication protocol compatible with a particular component of the data processing system 102 and a particular component of the client system 103. The interface controller 120 can be compatible with particular content objects, and can be compatible with particular content delivery systems corresponding to particular content objects. For example, the interface controller 120 can be compatible with transmission of video content, audio content, or any combination thereof. For example, the interface controller 120 can be compatible with payment processing transmissions by a protocol compatible with payment processing latency and encryption structures. The communication interface of the client system 103 can be compatible with the communication interface of the data processing system 102 to perform unidirectional or bidirectional communication between the interface controllers 120 and 122.

The content processor 160 can execute one or more actions in response to an authorization indication generated by the authorization processor 140. The content processor 160 can, for example, receive output from particular content objects within a particular container, in response to receiving transmission by the interface controller 122 based on a container or reference to a container.

Figure 2:
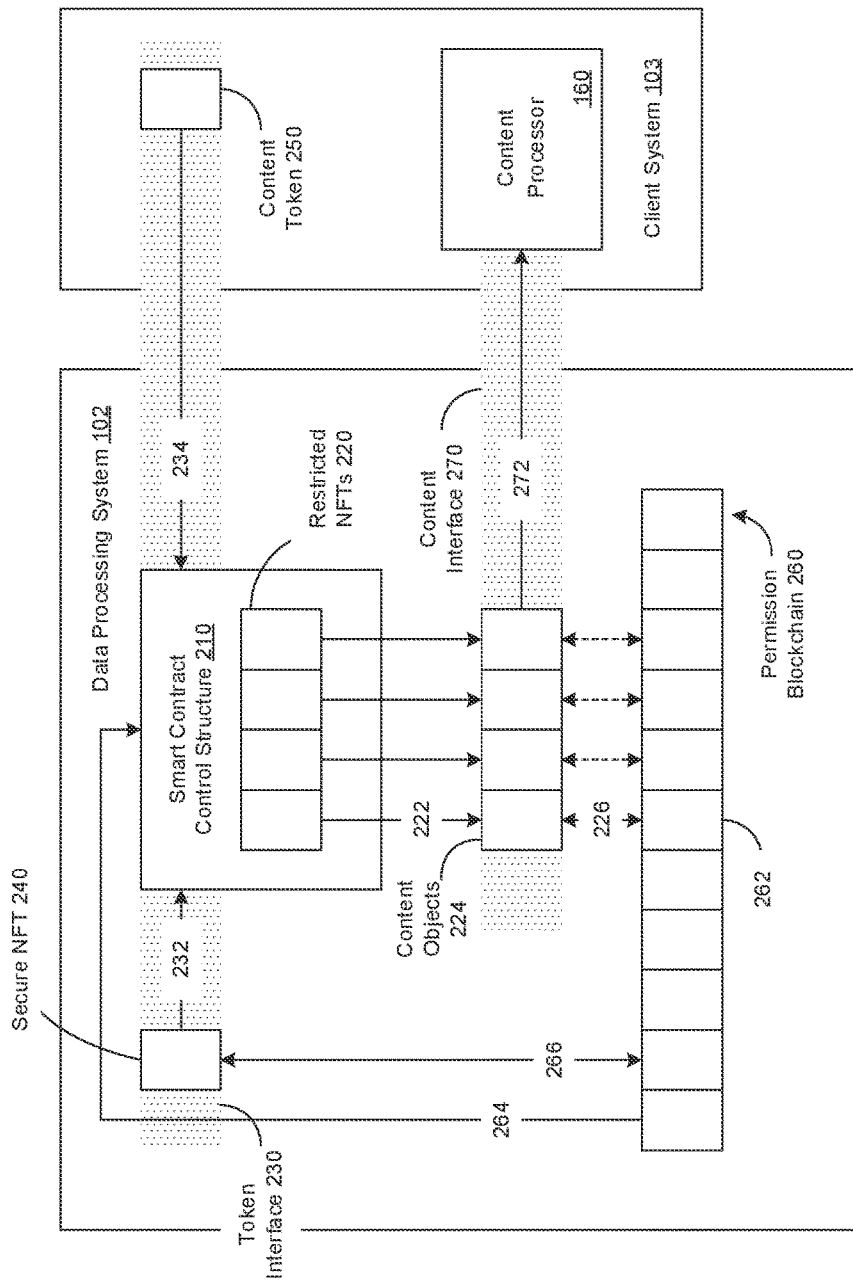
FIG. 2 illustrates an architecture in accordance with present implementations.

FIG. 2 illustrates an architecture in accordance with present implementations. As illustrated by way of example in FIG. 2, an example architecture 200 can include the data processing system 102 and the client system 103. The architecture 200 can include the content processor 160, a smart contract control structure 210, one or more restricted NFTs 220, one or more content links 222, one or more content objects 224, one or more blockchain links 226, a token interface 230, a security link 232, a client link 234, a secure NFT 240, a content token 250, a permission blockchain 260 with one or more blocks 262, a control link 264, a secure NFT link 266, a content interface 270, and a content link 272. A link as discussed herein can correspond to or include metadata. The metadata can, for example, be stored within or integrated with any smart contract, smart contract control structure, content object, block, blockchain, or any combination thereof.

The smart contract control structure 210 can include one or more instructions to restrict and transmit output of one or more of the content objects 224. The smart contract control structure 210 can correspond to an executable smart contract and can include a gateway component. The gateway component can include one or more instructions to restrict or prevent access to the restricted NFTs 220 in the absence of presence of one or more tokens compatible with the smart contract control structure 210. The smart contract control structure 210 can include an encapsulation layer that, for example, maintains the restricted NFTs in an encrypted state. The smart contract control structure 210 can permit access to the restricted NFTs based on a private key, for example, compatible with the encapsulation layer and operable to decrypt the encryption corresponding to the encapsulation layer. The gateway component can be compatible with and interface with the token interface 230, and the encapsulation layer can be integrated with the smart contract control structure 210.

The restricted NFTs 220 can each include a particular NFT and can correspond to particular content objects. A restricted NFT can be associated with a particular content object, and can be required to transmit output of the content object, transfer the content object to another storage location, or any combination thereof, for example. Each of the restricted NFTs 220 can indicate control of a particular content object of the content objects 224 by a corresponding content link of the content links 222. The content links 222 can include a reference, pointer, or the like, to or between each restricted NFT and each content object associated with that particular restricted NFT.

The content objects 224 can each include a particular data or instructions. A content objects can correspond to a collections of executable instructions or data that can be finite. For example, a content object can include a video file corresponding to a limited number of instances of video content. For example, a content object can include an audio file corresponding to a limited number of instances of audio content. For example, a content object can include a metric that increases with limited capacity, such as a physical measurement a financial instrument valuation, a periodic output based on a physical or scarce property, or any combination thereof.

The token interface 230 can include a communication channel between one or more of the smart contract control structure 210, the secure NFT at the data processing system 102, and the content token 250 at the client system 103. The token interface 230 can include an application programming interface compatible with the smart contract control structure 210 to detect the secure NFT at the data processing system 102, and the content token 250 at the client system 103. At least the token interface 230 or the smart contract control structure 210 can execute one or more instructions to determine whether one or more of the secure NFT 240 and the content token 250 are compatible with the smart contract control structure 210. The security link 232 can include a transmission path or communication path between the secure NFT 240 and the smart contract control structure 210 by the token interface 230. At least the token interface 230 or the smart contract control structure 210 can detect the secure NFT 240 via the security link 232. The client link 234 can include a transmission path or communication path between the content token 250 and the smart contract control structure 210 by the token interface 230. At least the token interface 230 or the smart contract control structure 210 can detect the content token 250 via the client link 234.

The secure NFT 240 can include an NFT associated with and controlled by the data processing system 102. Transmission of the secure NFT 240 can be restricted by the data processing system 102 to within the data processing system 102. For example, the secure NFT 240 can correspond to a "backup key" or "house key" that must be detected in order to the smart contract control structure 210 transmit output of the content objects 224 corresponding to the restricted NFTs 220. Thus, the secure NFT 240 can restrict authorization by the smart contract control structure 210 to the data processing system 102 environment. The content token 250 can include a token associated with and controlled by the client system 103. The content token 250 can include a fungible token or a semi-fungible token. For example, the content token 250 can include a fungible token to obtain output of a collection of freely accessible content objects 224. For example, the content token 250 can include a semi-fungible token to obtain output of a collection of content objects 224 accessible under limited conditions. Limited conditions can include content objects accessible by subscription. Transmission of the content token 250 can be restricted by the client system 103 to within the data processing system 102.

The permission blockchain 260 can include at least one blockchain including one or more of the blocks 262. The permission blockchain 260 can be linked to one or more content objects 224, secure NFTs 240, and smart contract control structures 210. The permission blockchain 260 can include a blockchain operated and controlled at the data processing system 102. The permission blockchain 260 can include a plurality of blockchains each corresponding to particular aspects of the links associated with the corresponding blockchains. The blocks 262 can include or store links to one or more objects associated with the blockchain. The blockchain links 226 can include a reference, pointer, or the like, to or between a block among the blocks 262 and a content object associated with that particular block. The control link 264 can include a reference, pointer, or the like, to or between a block among the blocks 262 and the smart contract control structure 210 associated with that particular block. The secure NFT link 266 can include a reference, pointer, or the like, to or between a block among the blocks 262 and the secure NFT 240 associated with that particular block.

The content interface 270 can include a communication channel between one or more of the content objects 224 at the data processing system 102, and the content processor 160 at the client system 103. The content interface 270 can include an application programming interface compatible with the content objects 224 to transmit data or instructions based on the content objects 224 to the content processor 160 of the client system 103. At least the content interface 270 or the content processor 160 can execute one or more instructions to obtain output of the content objects 224. The content link 272 can include a transmission path or communication path between the content objects 224 and the content processor 160 by the content interface 270. At least the content interface 270 or the content processor 160 can obtain output of the content objects 224 via the content link 272.

Figure 3:
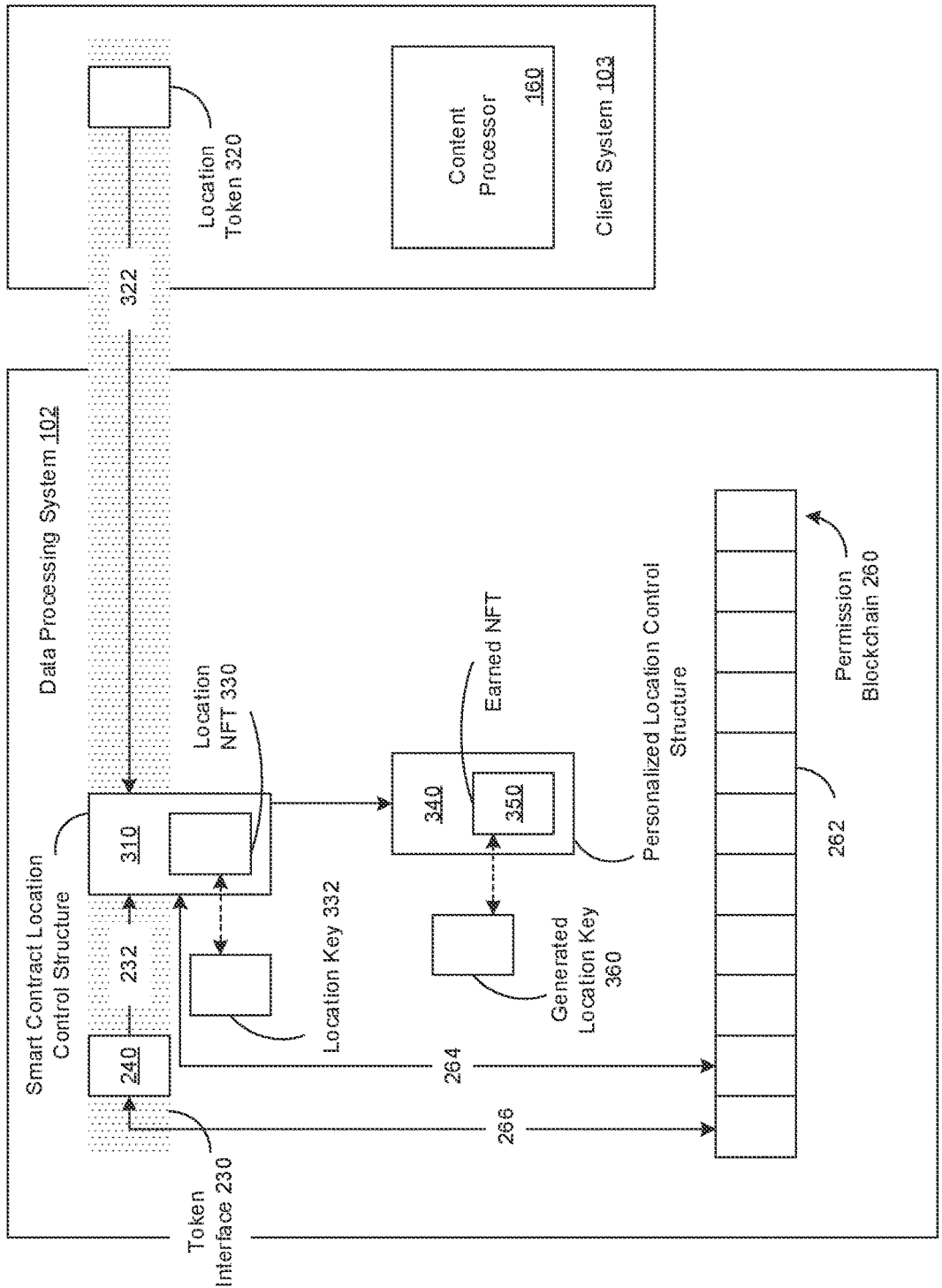
FIG. 3 illustrates an architecture to generate an NFT and a location key based on a location token, in accordance with present implementations.

FIG. 3 illustrates an architecture to generate an NFT and a location key based on a location token, in accordance with present implementations. As illustrated by way of example in FIG. 3, an example architecture 300 can include the data processing system 102, the client system 103, the content processor 160, the token interface 230, the security link 232, the client link 234, the secure NFT 240, the permission blockchain 260 with the blocks 262, the control link 264, the secure NFT link 266, a smart contract location control structure 310, a location token 320, a location NFT 330, a location key 332, a personalized smart contract control structure 350, and a generated location key 360.

The smart contract location control structure 310 can include one or more instructions to generate or modify one or more smart contract control structures, NFTs, and content objects. The smart contract location control structure 310 can correspond to an executable smart contract and can include a gateway component. The gateway component can include one or more instructions to restrict or prevent execution of the smart contract location control structure 310 in the absence of presence of one or more tokens compatible with the smart contract location control structure 310. The smart contract location control structure 310 can generate or modify the personalized smart contract control structure 350 based on a detection of presence of the location token 320. For example, based on parameters obtained from the location token 320, the smart contract location control structure 310 can generate the personalized smart contract control structure 350, and can generate the generated location key 360 from the location NFT 330.

The location token 320 can include an NFT, a fungible token or a semi-fungible token. For example, the location token 320 can include an NFT that identifies one or more location parameters related to the client system 103. For example, location parameters can include a Global Positioning System (GPS) latitude, a GPS longitude, an elevation, an address, one or more coordinates relative to a predetermined origin, one or more distances relative to one or more triangulation locations, or any combination thereof. The client link 322 can include a transmission path or communication path between the location token 320 and the smart contract location control structure 310 by the token interface 230. At least the token interface 230 or the smart contract location control structure 310 can detect the location token 320 via the client link 322. For example, the location token 320 can be generated at the client system 103 in response to an instruction from a location detection circuit of the client system 103 to generate a location parameter corresponding to a current location of the client system 103.

The location NFT 330 can include an NFT corresponding to a particular predetermined physical location. The location NFT 330 can correspond to an NFT generated or "minted" by an originating system corresponding to the physical location or a system corresponding to the physical location. For example, the location NFT 330 can correspond to a particular NFT indicating ownership of a particular physical space or portion thereof by a particular entity. For example, the data processing system 102 can generate the location NFT 330 in response to an assignment by the data processing system 102 of a particular coordinate, geofence, or the like to a particular controlling entity. For example, the location NFT 330 can include a temporal aspect that ownership of the particular physical space or portion thereof by a particular entity during a particular time period defined with respect to or bounded by one or more timestamps. For example, a location NFT 330 can include a timestamp that indicates a time at which a location NFT 330 is executable with respect to a particular physical space. A plurality of such timestamps can identify one or more time periods with a beginning and an end of any restriction, for example. For example, a location NFT 330 can be minted and linked with a particular conference room during a particular weekend during which a controller of the location NFT 330 is conducting a conference at the conference room. For example, the conference room can be physical or virtual.

The location key 332 can include one or more instructions executable to perform an operation corresponding to a particular location. For example, the location key 332 can correspond to an instruction to actuate a particular electronic lock or smart lock device. The lock can correspond to, for example, a lock of a conference room, external premises control, or any combination thereof. This technical solution can provide a technical improvement of secure NFT-based control of transmission and execution of access keys for systems that are not limited to systems or devices configured to or capable of conducting NFT detection or processing.

The personalized smart contract control structure 350 can correspond at least partially in one or more of structure and operation to the smart contract location control structure 310, and be generated based on the location token 320. The smart contract location control structure 310 can generate the personalized smart contract control structure 350 in response to an instruction or value of the location token 320 that indicates a correspondence or match between a location of the location key 332 and a location of the location token 320. In response to determining the match, the personalized smart contract control structure 350 can generate the personalized smart contract control structure 350 corresponding to a user or used account linked with the client system 103.

The generated location key 360 include one or more instructions executable to perform an operation corresponding to a particular location, and can be linked with a particular user device or user corresponding to a particular user device. The generated location key 360 can correspond at least partially in one or more of structure and operation to the location key 332. The generated location key 360 can include, for example, an identifier corresponding to a particular user device or user linked with the generated location key 260, to identify a particular user. For example, the generated location key 360 can including one or more parameters to identify a particular user, user device, or usage history of operation of a lock compatible with the generated location key 360.

Figure 4:
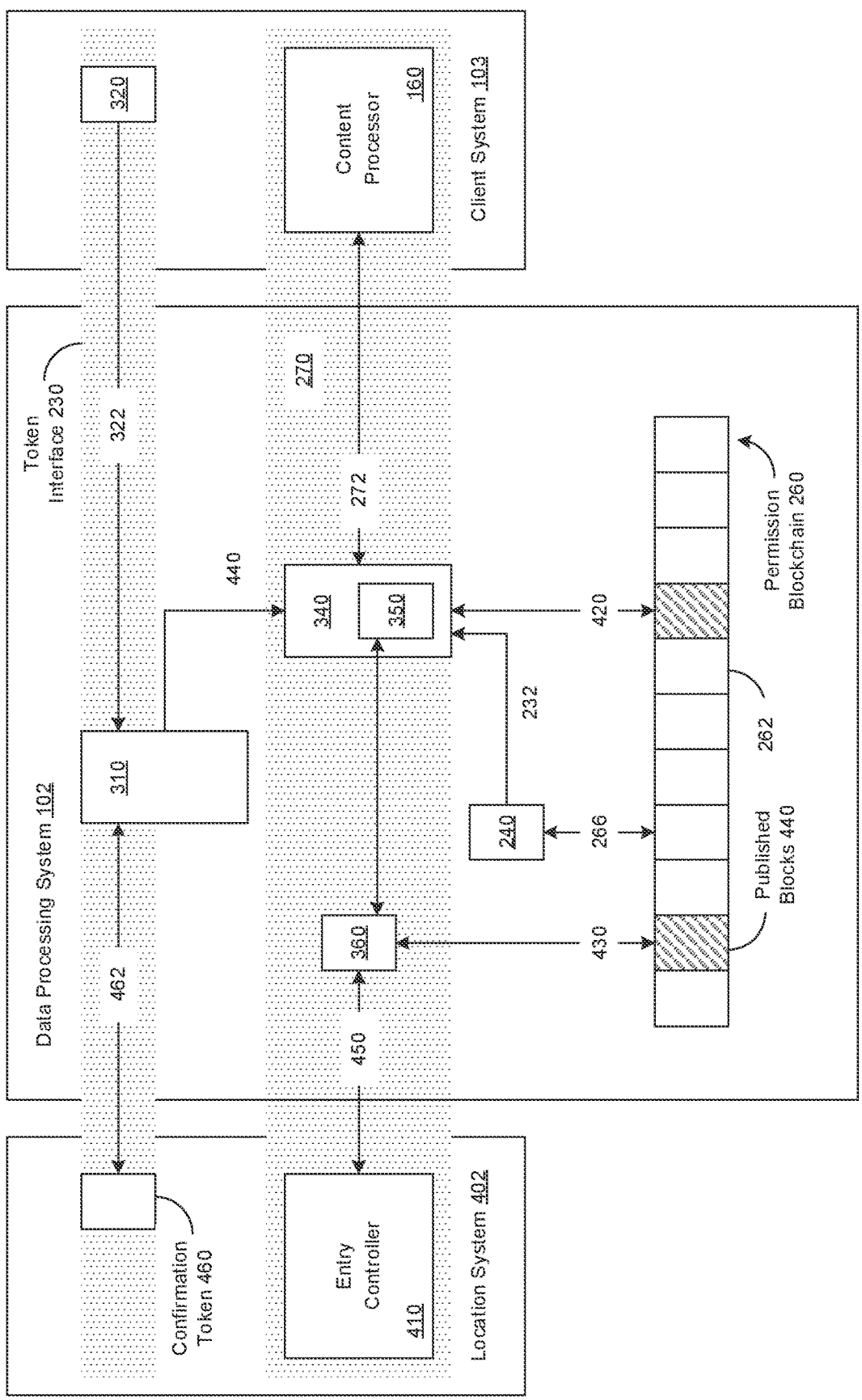
FIG. 4 illustrates an architecture to modify publication to a blockchain of an earned NFT and a location key linked with the earned NFT, in accordance with present implementations.

FIG. 4 illustrates an architecture to modify publication to a blockchain of an earned NFT and a location key linked with the earned NFT, in accordance with present implementations. As illustrated by way of example in FIG. 4, an example architecture 400 can include the data processing system 102, the client system 103, the content processor 160, the token interface 230, the secure NFT 240, the permission blockchain 260 with the blocks 262, the secure NFT link 266, the content interface 270, the content link 272, the smart contract location control structure 310, the location token 320, the personalized smart contract control structure 350, the generated location key 360, a location system 402 including an entry controller 410, a personalized smart contract link 420, a generated location key link 430, published blocks 440, a control link 450, a confirmation token 460, and a confirmation link 462.

The location system 402 can include a computing system located remotely from the data processing system 102 and located at a particular physical location. For example, the location system 402 can correspond to a computing system located at a particular conference facility, office, hotel, or the like. The location system 402 can include various embedded systems coupled with various sensors and electromechanical devices, for example. The entry controller 410 can include an embedded system located at, with or corresponding to the location system 402. An embedded system can correspond to a device or collection of devices at least temporarily affixed to or associated with a particular location. An embedded device is not limited to a device integrated with a particular system or object, and is not limited to a device having a reduced form factor, size, or computing capacity as compares to the data processing system 102 or the client system 103. The entry controller 410 can Sensors can include, for example, motion sensors, video cameras, microphones, temperature sensors, or any combination thereof. For example, electromechanical devices can include locks, doors, barriers, or the like, that can be electronically or electrically actuated or operated. For example, the entry controller 410 can include a smart lock or electronic lock operable with a particular location key. The personalized smart contract link 420 can link the personalized smart contract control structure 350 with the permission blockchain 260. The generated location key link 430 can link the generated location key 360 with the permission blockchain 260.

The published blocks 440 can include one or more blocks of the permission blockchain 260 linked with various ones of the smart contract control structures 310 and 340 and the generated location key 360. The smart contract location control structure 310 can be compatible with the permission blockchain 260 and can modify the permission blockchain 260. For example, the smart contract location control structure 310 can add a block to the permission blockchain 260 at any end of the blockchain according to a last-in-first-out (LIFO) structure or a first-in-first-out (FIFO) structure, or can add a block 262 within the permission blockchain 260 between two existing blocks 262. The control link 450 can link the generated location key 360 with the entry controller 410. For example, the personalized smart contract control structure 350 can transmit the generated location key 360 to the entry controller 410 via the content interface 270. For example, the content interface 270 can include a wireless communication protocol compatible with the entry controller 410.

The confirmation token 460 can include an NFT, a fungible token or a semi-fungible token. For example, the confirmation token 460 can include an NFT that indicates a time and date of an operation of the entry controller 410. For example, the confirmation token 460 can include an NFT that identifies the generated location key 360. For example, the confirmation token 460 can include an NFT that identifies any token contained within, associated with or corresponding to the generated location key 360 or the personalized smart contract control structure 350. For example, the confirmation token 460 can include an NFT that identifies any user device associated with or corresponding to the generated location key 360. The confirmation link 462 can link the confirmation token 460 with the smart contract location control structure 310. The smart contract location control structure 310 can query one or more confirmation tokens corresponding to one or more operations at one or more entry controllers to generate a record of transactions. This technical solution can provide a technical advantage of tracing operations of entry controllers at multiple locations to identify individual users of the entry controller by a distributed NFT architecture.

Figure 5:
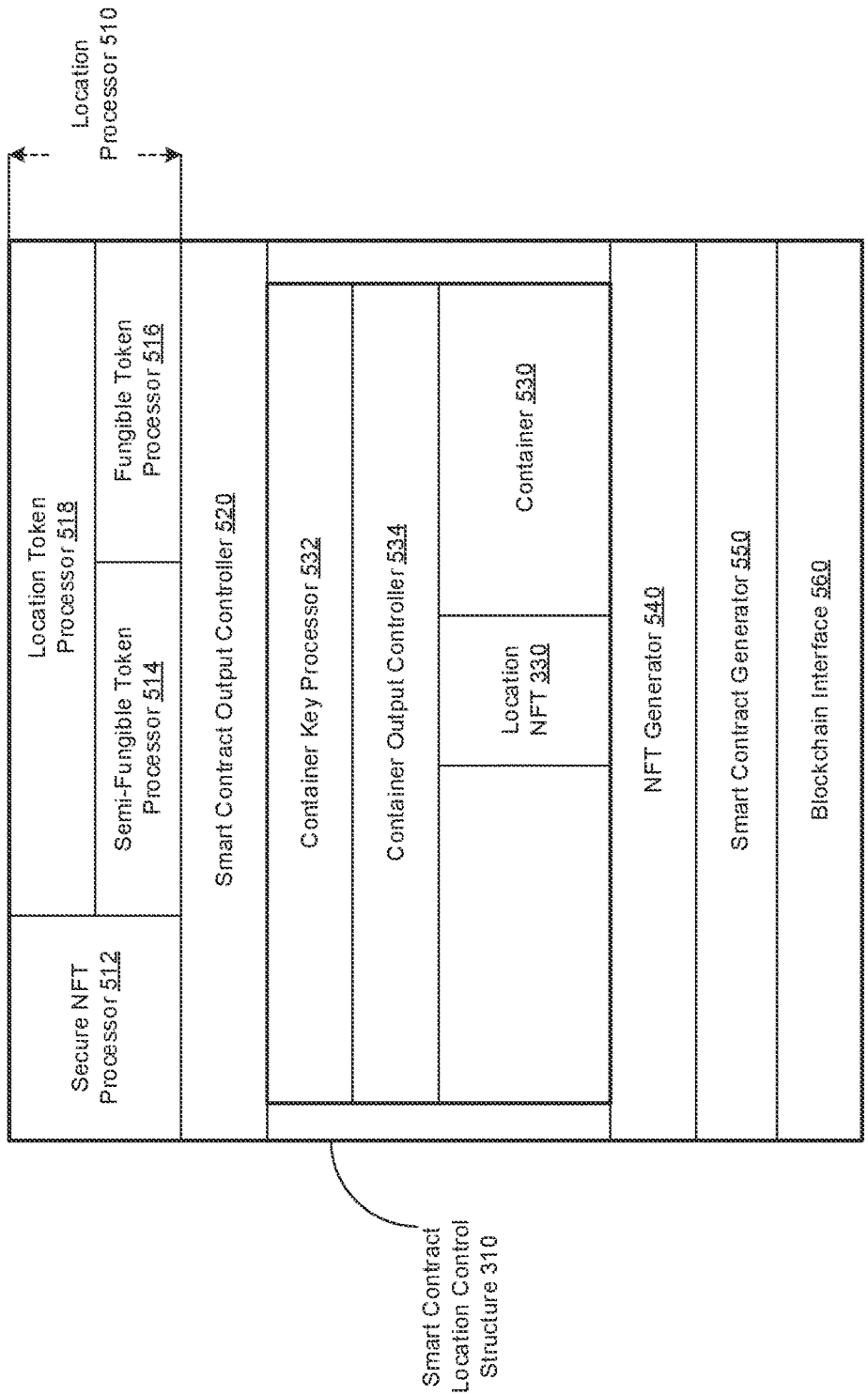
FIG. 5 illustrates a smart contract control architecture in accordance with present implementations.

FIG. 5 illustrates a smart contract control architecture in accordance with present implementations. As illustrated by way of example in FIG. 5, an example smart contract control architecture 500 can include the smart contract location control structure 310. The smart contract location control structure 310 can include the location NFT 330, a location processor 510, a secure NFT processor 512, a semi-fungible token processor 514, a fungible token processor 516, a location token processor 518, a smart contract output controller 520, a container 530, a location key processor 532, a container output controller 534, an NFT generator 540, a smart contract generator 550, and a blockchain interface 560.

The location processor 510 can communication with and validate one or more tokens. The location processor 510 can include one or more interfaces corresponding to an API or a smart contract interface, for example. A smart contract interface can include one or more executable instructions integrated with a smart contract. The smart contract interface can execute instructions at the smart contract or triggered by the smart contract in response to detection of objects or conditions external to the smart contract. The location processor 510 can comprise at least a portion of a control structure of the smart contract. The location processor 510 can include a control structure. The location processor 510 can include a secure NFT processor 512, a semi-fungible token processor 514, a fungible token processor 516, and a location token processor 518.

The secure NFT processor 512 TTT can detect the presence of a secure NFT 240, and can determine whether the secure NFT 240 is compatible with the secure NFT processor 512. The secure NFT processor 512 can be configured to be compatible with a particular secure NFT 240, or can be generated to be compatible with a particular secure NFT 240. For example, the secure NFT processor 512 can be integrated with or store a hash based on a particular secure NFT 240 and a hash processor operable to generate a hash based on any secure NFT 240. The secure NFT processor 512 can generate a hash in response to detecting the presence of the secure NFT 240, and can determine whether the secure NFT 240 is compatible with the smart contract control structure, in response generating the hash, by comparing the generated hash with the stored hash. The secure NFT processor 512 can include logic to detect a secure NFT 240 passed to it, by, for example, a JSON object or a header argument.

The semi-fungible token processor 514 can detect the presence of a semi-fungible token, and can determine whether the semi-fungible token is compatible with the semi-fungible token processor 514. The semi-fungible token processor 514 can be configured to be compatible with a particular semi-fungible token, or can be generated to be compatible with a particular semi-fungible token. The semi-fungible token processor 514 can be configured to be compatible with a plurality of tokens having a particular characteristic, or can be generated to be compatible with a plurality of tokens having a particular characteristic. A particular characteristic can include, for example, a particular identifier or portion of an identifier of a token. For example, the semi-fungible token processor 514 can be integrated with or store a hash based on a particular semi-fungible token and a hash processor operable to generate a hash based on any semi-fungible token. The semi-fungible token processor 514 can generate a hash in response to detecting the presence of the semi-fungible token, and can determine whether the semi-fungible token is compatible with the smart contract location control structure 310, in response generating the hash, by comparing the generated hash with the stored hash. The semi-fungible token processor 514 can include logic to detect a semi-fungible token passed to it, by, for example, an activation instruction from the transform token processor 518.

The fungible token processor 516 can detect the presence of a fungible token, and can determine whether the fungible token is compatible with the fungible token processor 516. The fungible token processor 516 can be configured to be compatible with a particular fungible token, or can be generated to be compatible with a particular fungible token. The fungible token processor 516 can be configured to be compatible with a plurality of tokens having a particular characteristic, or can be generated to be compatible with a plurality of tokens having a particular characteristic. A particular characteristic can include, for example, a particular identifier or portion of an identifier of a token. For example, the fungible token processor 516 can be integrated with or store a hash based on a particular fungible token and a hash processor operable to generate a hash based on any fungible token. The fungible token processor 516 can generate a hash in response to detecting the presence of the fungible token, and can determine whether the fungible token is compatible with the smart contract location control structure 310, in response generating the hash, by comparing the generated hash with the stored hash. The fungible token processor 516 can include logic to detect a fungible token passed to it, by, for example, an activation instruction from the transform token processor 518.

The location token processor 518 can detect the presence of a semi-fungible token or a fungible token, and can transmit the semi-fungible token or the fungible token respectively to the semi-fungible token processor 514 or the fungible token processor 516. The location token processor 518 can be configured to be compatible with any NFT, semi-fungible fungible token or fungible token, or can be generated to be compatible with any semi-fungible token or fungible token. The location token processor 518 can be configured to identify a semi-fungible fungible token or a fungible token, or can be generated to identify any semi-fungible token or fungible token. For example, the location token processor 518 can identify a particular identifier or portion of an identifier of a token to determine whether the token includes a semi-fungible token or a fungible token. The location token processor 518 can transmit the token to the semi-fungible token processor 514 in response to a determination that the token includes a semi-fungible token. The location token processor 518 can transmit the token to the fungible token processor 516 in response to a determination that the token includes a fungible token. For example, the location token processor 518 can detect a semi-fungible location token 250 corresponding to a collection of interchangeable entry controllers, and can detect a fungible location token 250 corresponding to a freely-accessible entry controller at a particular location.

The smart contract output controller 520 can selectively transmit output from the location NFT 330 based on determinations from one or more of the secure NFT processor 512, the semi-fungible token processor 514, and the fungible token processor 516. For example, the smart contract output controller 520 can include a communication channel and a control structure to activate or deactivate the communication channel. The communication channel can communicatively couple the location NFT 330 with a communication interface external to the smart contract control structure. For example, the smart contract output controller 520 can activate the communication channel in response to a determination that a secure NFT 240 and a content token 250 are both compatible with the smart contract control structure 310. The smart contract output controller 520 can perform corresponding actions with respect to any token stored with the smart contract and the transform processor, including any location NFT and any earned NFT.

The container 530 can include a security layer that restrict access to one or more of the location NFT 330 and any earned NFT. The container 330 can include, for example, a security encapsulation that partially or completely encrypts one or more components of the container 530. The container 530 can include a container key processor 532, a container output controller 334, and the location NFT 330.

The container key processor 532 can detect the presence of a private key, and can determine whether the private key is compatible with the container 530. The container key processor 532 can obtain the private key from one or more of the non-fungible token, a semi-fungible token or a fungible token, and can transmit the semi-fungible token or the fungible token respectively to the semi-fungible token processor 314 or the fungible token processor 316. For example, the private key can be stored entirely within the location token 250. For example, the private key can be stored entirely within the secure NFT 240, to restrict output from the container to the logical location corresponding to the secure NFT 240. For example, the private key can be stored partially within the secure NFT 240 and partially within the location token 250, to restrict output from the container to the logical location corresponding to the secure NFT 240 by a distributed key.

The container output controller 534 can selectively transmit output from one or more of the location NFT 330 or any earned NFT stored in the container 530 based on determinations from the container key processor 532. For example, the container output controller 534 can include a communication channel and a control structure to activate or deactivate the communication channel. The communication channel can communicatively couple the location NFT 330 or any earned NFT with smart contract output controller 320. For example, the container output controller 534 can activate the communication channel in response to a determination that the private key is compatible with the container key processor 532.

The NFT generator 540 can generate one or more earned NFTs in accordance with a location token 250 obtained at the location processor 510. For example, the NFT generator 530 can generate an earned NFT based on a determination by the NFT generator 540 that a location corresponding to the location token 250 matches a location corresponding to the location NFT 330. The NFT generator 540 can generate an earned NFT including one or more parameters linked with a particular physical location corresponding to the location NFT 330 and a particular user corresponding to the client system 103. The NFT generator 540 can extract a parameter from the location NFT 330 that corresponding to a predetermined physical location linked with or identified by the location NFT. For example, the system can generate, based on the public key and the physical environment, the smart contract and the control structure compatible with the NFT, the user, and the physical environment. For example, the system can generate, based on the public key and a private key of the user, the control structure to restrict entry to a predetermined portion of the physical environment. For example, the system can generate in response to the determination that that the NFT and the public key are compatible with the control structure of the smart contract, a second NFT linked with a second physical environment.

The smart contract generator 550 can generate the personalized smart contract control structure 350, for example, in response to a determination by the NFT generator 540 that a location corresponding to the location token 250 matches a location corresponding to the location NFT 330. Smart contract generator 550 can generate a container having an encapsulation layer restricted to compatibility with or compatible only with a particular one of the client system 103, the location token 320, or a user linked with the client system 103. Thus, the smart contract generator 550 can provide a technical improvement to generate the personalized smart contract control structure 350 having a personalized security architecture linked with a system of a user at a particular location corresponding to the location NFT 330. For example, the system can generate, based on the public key and a private key of the particular user, the control structure including a container configured to encapsulate the NFT and a second NFT linked with a second physical environment. For example, the processor can generate, based on the public key and the physical environment, the smart contract and the control structure compatible with the NFT, the user, and the physical environment.

The blockchain interface 560 can include an API compatible with the permission blockchain 260. The blockchain interface 560 can selectively add, modify, and delete blocks from the permission blockchain 260. The blockchain interface 560 can add, modify, and delete blocks in accordance with restrictions or interfaces of the permission blockchain 260, and can add, modify, and delete blocks independently of the restrictions or interfaces of the permission blockchain 260 at any portion or index of the permission blockchain 260.

Figure 6:
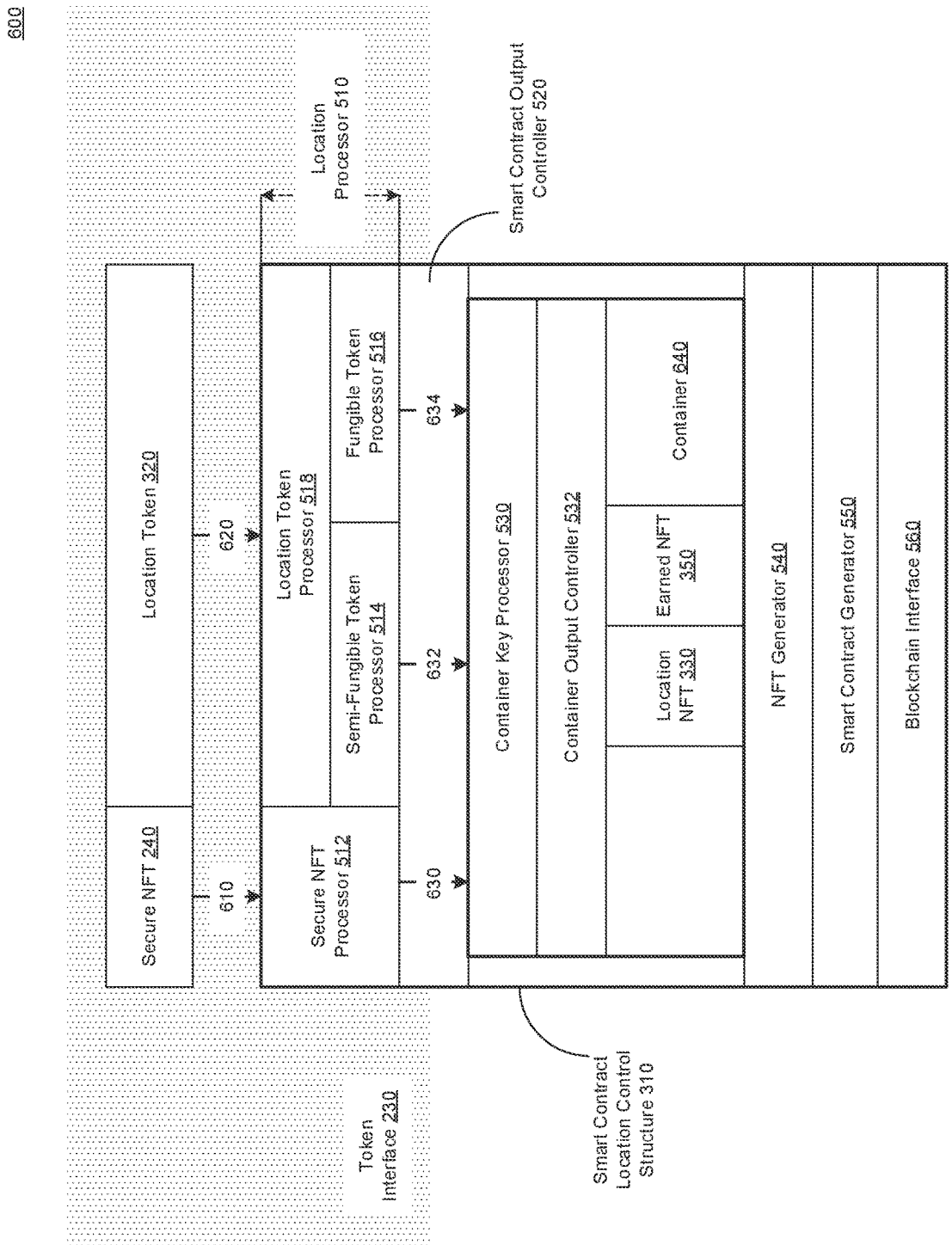
FIG. 6 illustrates a smart contract control architecture compatible with a location token, in accordance with present implementations.

FIG. 6 illustrates a smart contract control architecture compatible with a location token, in accordance with present implementations. As illustrated by way of example in FIG. 6, an example smart contract control architecture 600 can include the token interface 230, the secure NFT 240, the location token 320, and the smart contract location control structure 310. The token interface 230 can perform detection 610 of the secure NFT 240, and detection 620 of the transform token 320. The detection 610 can be responsive to an action by the token interface 230 to transmit the secure NFT 240 to the smart contract location control structure 310. The secure NFT processor 512 can detect the secure NFT 240 obtained by the smart contract location control structure 310 via the location processor 510. The detection 620 can be responsive to an action by the token interface 230 to transmit the location token 320 to the smart contract location control structure 310. The location token processor 518 can detect the location token 320 obtained by the smart contract location control structure 310 via the token interface 230.

The smart contract location control structure 310 can perform minting 630, minting 640, or minting 650 in response to a determination by the location processor 510 that the location token 320 and the secure NFT 240 are compatible with the smart contract location control structure 310. The minting 630, 640 and 650 can each generate an earned NFT, including the earned NFT 350. The smart contract location control structure 310 can transmit the earned NFT 350 to the container 530 after the NFT generator 540 generates the earned NFT therein. For example, the smart contract location control structure 310 can transmit the earned NFT 350 to the personalized smart contract control structure 350. For example, the smart contract location control structure 310 can generate the personalized smart contract control structure 350 including the earned NFT 350. The container 640 can correspond at least partially in one or more of structure and operation to the container 530, and can include one or more NFTs. For example, the container 640 can include the location NFT 330 and the earned NFT 350.

Figure 7:
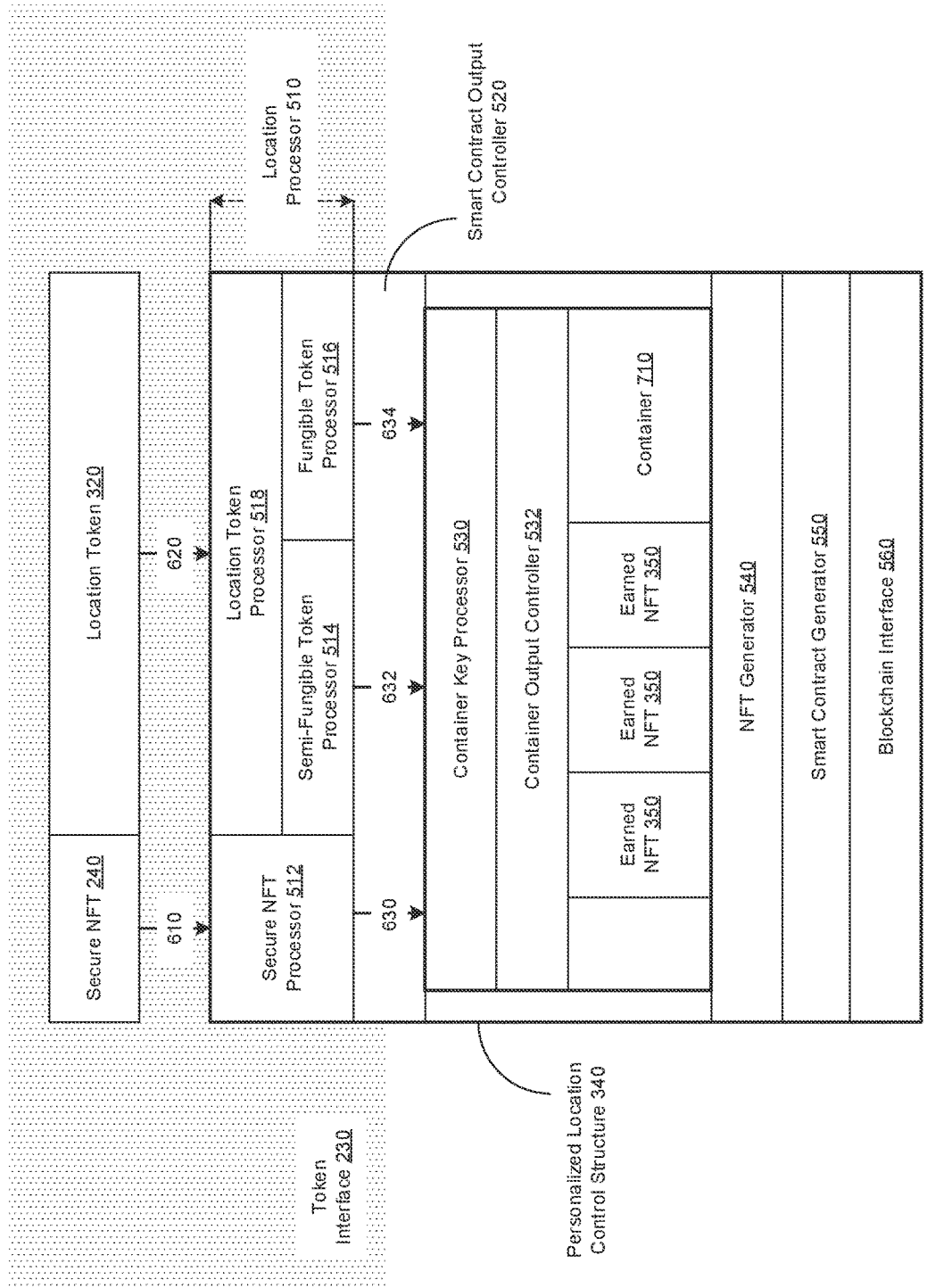
FIG. 7 illustrates a smart contract control architecture compatible with a plurality of earned NFTs, in accordance with present implementations.

FIG. 7 illustrates a smart contract control architecture compatible with a plurality of earned NFTs, in accordance with present implementations. As illustrated by way of example in FIG. 6, an example smart contract control architecture 600 can include the token interface 230, the secure NFT 240, the location token 320, and the smart contract location control structure 310. The smart contract location control structure 310 can include a container 710. The container 710 can correspond at least partially in one or more of structure and operation to the container 530, and can include one or more NFTs. For example, the container 710 can include earned NFTs 350 that are linked with or generated in response to a location token 320 received by a particular client system 103 or a plurality of client systems 103 each linked with a particular user. For example, the container 710 can correspond to a "wallet" including a plurality of earned NFTs associated with activity by a particular user to reach one or more physical locations each corresponding to respective ones of the earned NFTs 350. For example, a user can attend various booths at a conference of a trade show, and can collect earned NFTs in the container 710 in response to determinations that the user device of the user remained at each booth for a predetermined amount of time. For example, a predetermined amount of time can correspond to a threshold indicating a minimum amount of time spent at a particular location corresponding to a location NFT before an earned NFT can be minted. For example, a minimum amount of time can be five minutes.

Figure 8:
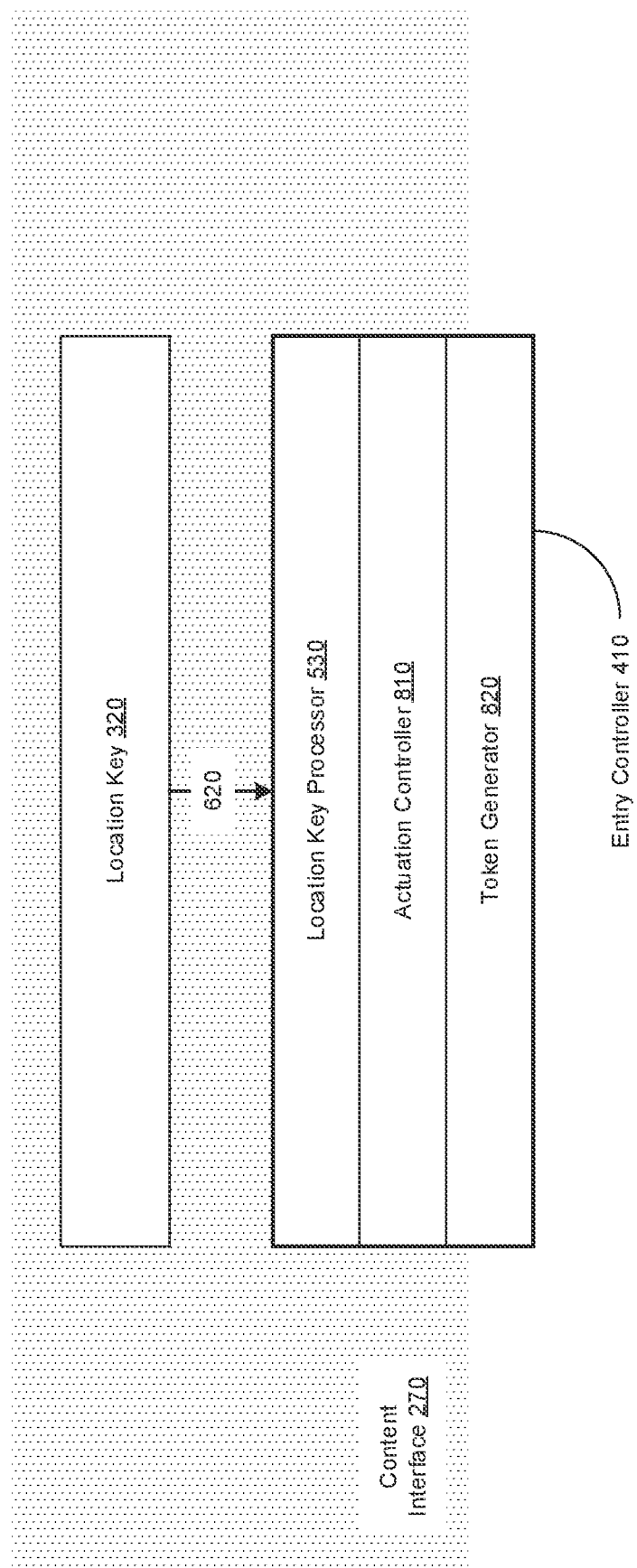
FIG. 8 illustrates a content processor architecture in accordance with present implementations.

FIG. 8 illustrates a content processor architecture in accordance with present implementations. As illustrated by way of example in FIG. 8, an example architecture 800 can include the content interface 270, the location key 320, and the entry controller 410. The entry controller 410 can perform the detection 620 and can include the location key processor 530, an actuation controller 810, and a token generator 820.

The actuation controller 810 can operate a mechanical device in response to a determination by the location key processor 530 that the location key 320 is compatible with the entry controller 410 by the detection 620. For example, the actuation controller 810 can instruct a smart lock to disengage a lock mechanism. For example, the actuation controller 810 can instruct a door or barrier to move into a position to create an opening for a person or object to pass through. For example, the actuation controller 810 can instruct a smart lock or a door to allow entry to a particular user having an earned NFT 350 corresponding to the location. For example, the system can cause the entry controller can validate an entry key based on the NFT to permit entry to the physical environment, the instruction including the entry key. For example, the entry controller can restrict entry to the physical environment during a predetermined time. Thus, this technical solution can provide a technical improvement of providing a distributed architecture for minting of earned NFTs based on satisfaction of particular conditions based on physical properties. For example, physical properties can include one or more of location, time, weight, mass, speed, acceleration, or any combination thereof.

The token generator 820 can generate the confirmation token 460 in response to the determination by the location key processor 530 that the location key 320 is compatible with the entry controller 410 by the detection 620. For example, the token generator 820 can generate the confirmation token 460 in response to completion of an act to operate a mechanical device. For example, the NFT can include an environment parameter corresponding to a characteristic of the physical environment. For example, the NFT can include a user parameter corresponding to a characteristic of the user.

Figure 9:
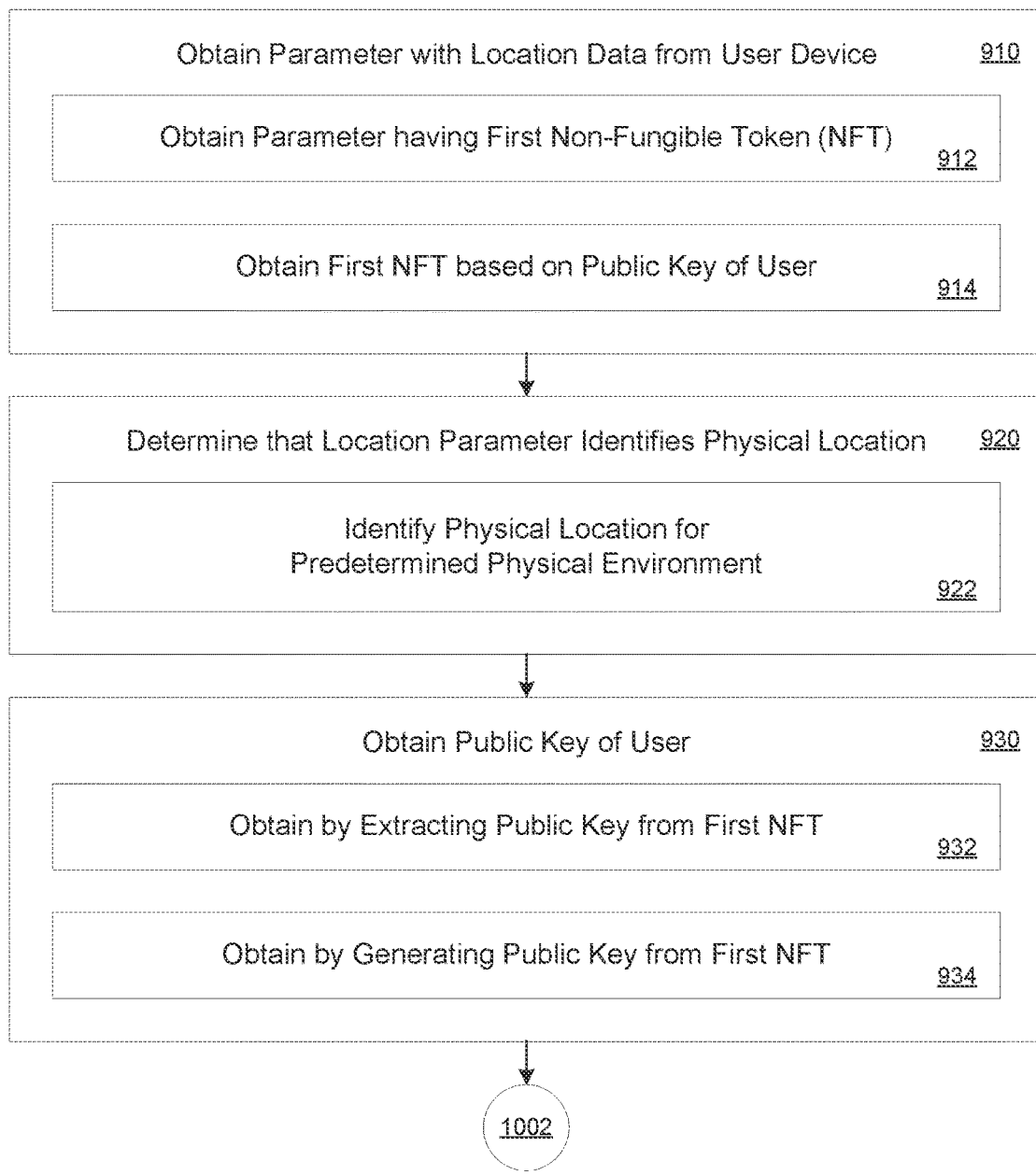
FIG. 9 illustrates a method of generation and validation of NFTs linked with physical environments, in accordance with present implementations.

FIG. 9 illustrates a method of generation and validation of NFTs linked with physical environments, in accordance with present implementations. At least one of the example systems 100, 200, 300 and 400, or the example structures 500, 600, 700 and 800 can perform method 900 according to present implementations. The method 900 can begin at 910.

At 910, the method 900 can obtain a parameter with location data from a user device. For example, the NFT can include an environment parameter corresponding to a characteristic of the physical environment. For example, the NFT can include a user parameter corresponding to a characteristic of the user. 910 can include at least one of 912 and 914. At 912, the method 900 can obtain a parameter having an NFT. At 914, the method 900 can obtain a first NFT based on a public key of a user. The method 900 can then continue to 920.

At 920, the method 900 can determine that a location parameter identifies a physical location. 920 can include 922. At 922, the method 900 can determine that a location parameter identifies a physical location corresponding to a predetermined physical environment. The method 900 can then continue to 930.

At 930, the method 900 can obtain a public key corresponding to or linked with a particular user or user device. 930 can include at least one of 932 and 934. At 932, the method 900 can obtain a public key by extracting a public key from a first NFT. At 934, the method 900 can obtain a public key by generating a public key from a first NFT. The method 900 can then continue to 1002.

Figure 10:
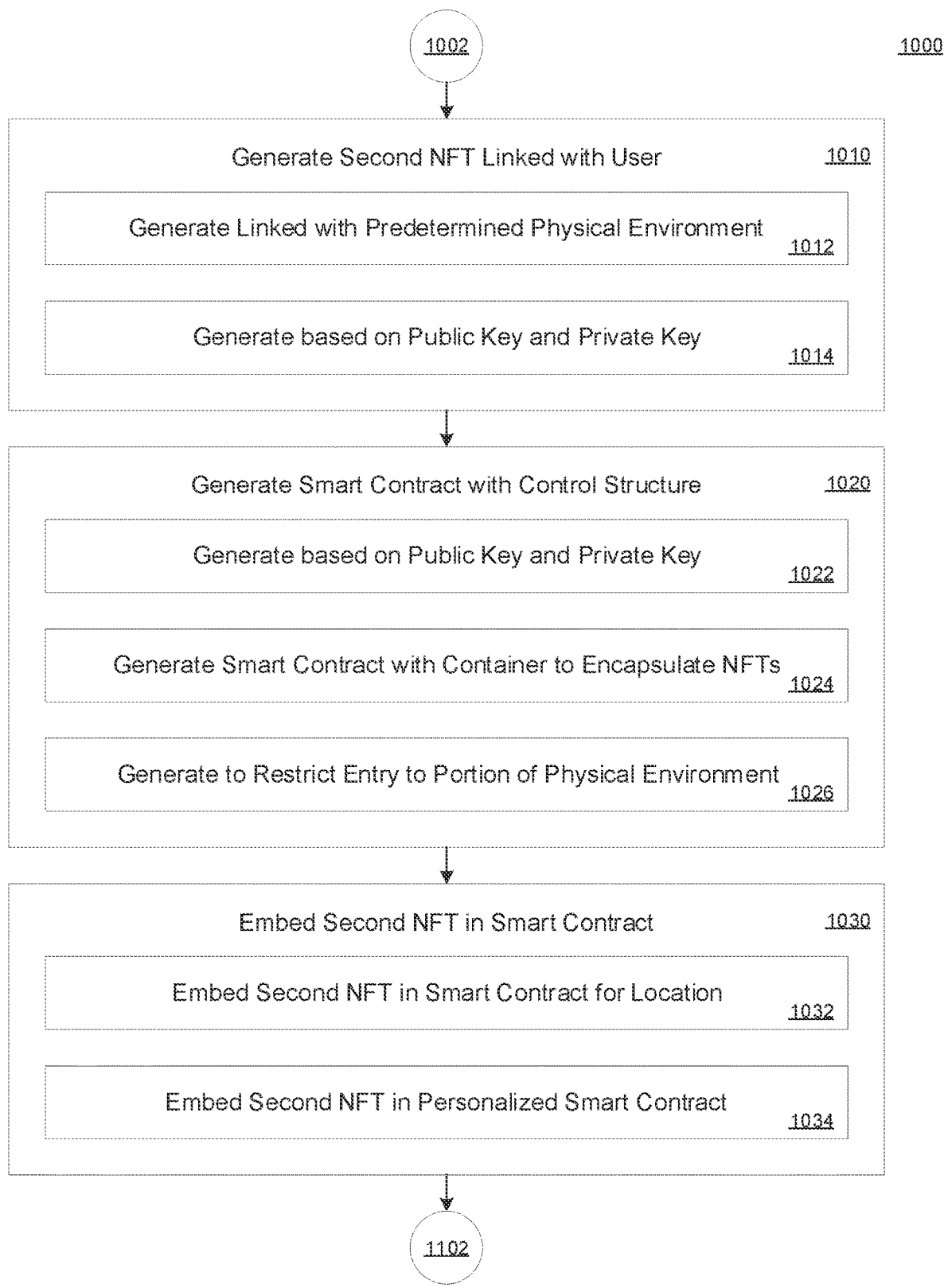
FIG. 10 illustrates a method of generation and validation of NFTs linked with physical environments, in accordance with present implementations.

FIG. 10 illustrates a method of generation and validation of NFTs linked with physical environments, in accordance with present implementations. At least one of the example systems 100, 200, 300 and 400, or the example structures 500, 600, 700 and 800 can perform method 1000 according to present implementations. The method 1000 can begin at 1002. The method 1000 can then continue to 1010.

At 1010, the method 1000 can generate a second NFT linked with a user. For example, the method 1000 can include generating in response to the determination that that the NFT and the public key are compatible with the control structure of the smart contract, a second NFT linked with a second physical environment. 1010 can include at least one of 1012 and 1014. At 1012, the method 1000 can generate a second NFT linked with a predetermined physical environment. For example, the method 1000 can include generating, based on the public key and a private key of the particular user, the control structure including a container configured to encapsulate the NFT and a second NFT linked with a second physical environment. At 1014, the method 1000 can generate a second NFT linked with a user based on one or more of a public key and a private key. The method 1000 can then continue to 1020.

At 1020, the method 1000 can generate a smart contract having a control structure. For example, the method 1000 can include generating, based on the public key and the physical environment, the smart contract and the control structure compatible with the NFT, the user, and the physical environment. 1020 can include at least one of 1022, 1024 and 1026. At 1022, the method 1000 can generate a smart contract having a control structure based on one or more of a public key and a private key. For example, the method 1000 can include generating, based on the public key and a private key of the user, the control structure to restrict entry to a predetermined portion of the physical environment. At 1024, the method 1000 can generate a smart contract having a container to encapsulate one or more NFTs. At 1026, the method 1000 can generate a smart contract to restrict entry to at least a portion of a physical environment. The method 1000 can then continue to 1030.

At 1030, the method 1000 can embed a second NFT in a smart contract. 1030 can include at least one of 1032 and 1034. At 1032, the method 1000 can embed a second NFT corresponding to a particular physical location in a smart contract. At 1034, the method 1000 can embed a second NFT in a personalized smart contract. The method 1000 can then continue to 1102.

Figure 11:
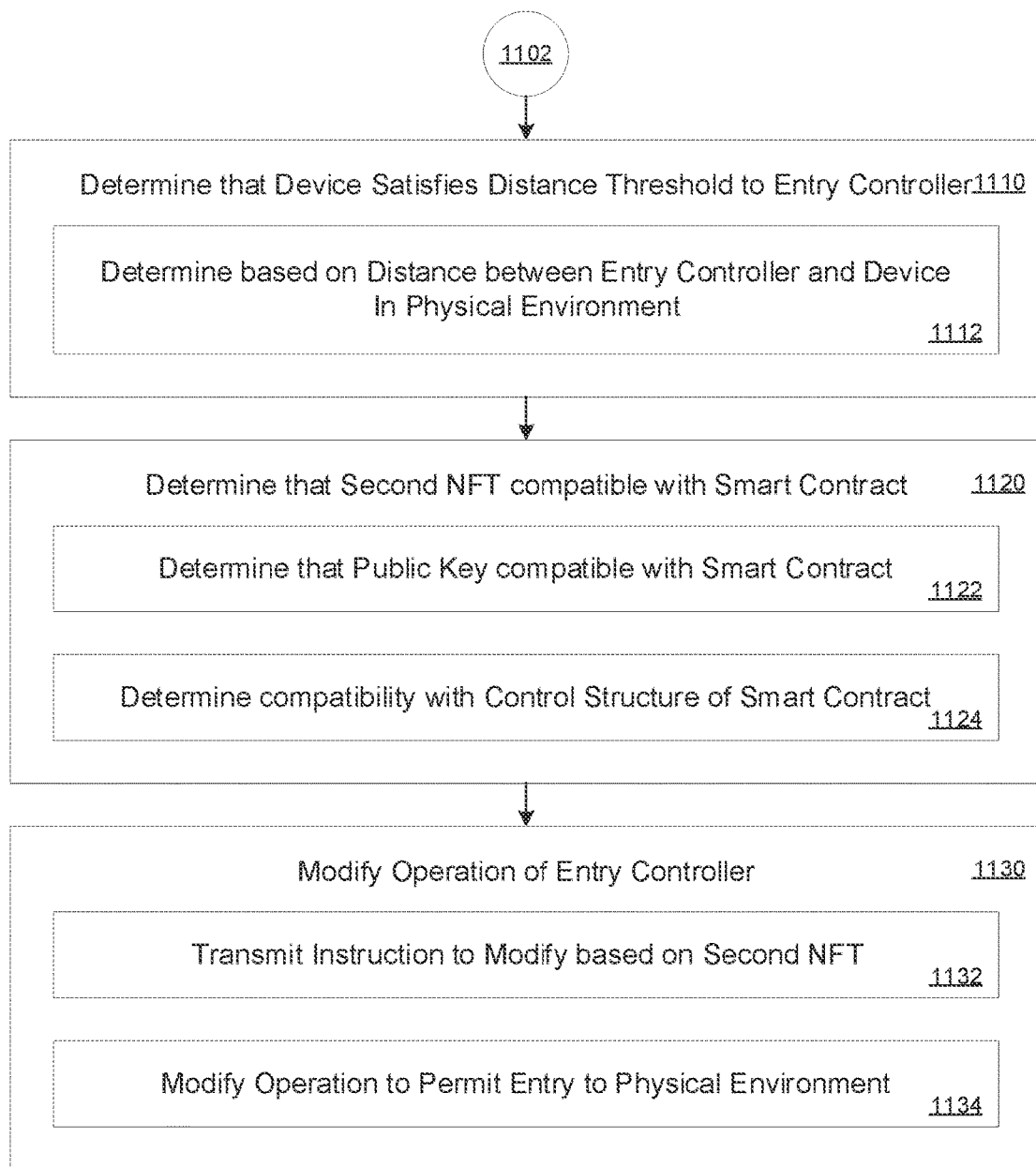
FIG. 11 illustrates a method of generation and validation of NFTs linked with physical environments, in accordance with present implementations.

FIG. 11 illustrates a method of generation and validation of NFTs linked with physical environments, in accordance with present implementations. At least one of the example systems 100, 200, 300 and 400, or the example structures 500, 600, 700 and 800 can perform method 1100 according to present implementations. The method 1100 can begin at 1102. The method 1100 can then continue to 1110.

At 1110, the method 1100 can determine that a particular device satisfies a distance threshold to an entry controller. 1110 can include 1112. At 1112, the method 1100 can determine that a particular device satisfies a distance threshold to an entry controller based on a distance between the entry controller and the device in a physical environment. The method 1100 can then continue to 1120.

At 1120, the method 1100 can determine that a second NFT is compatible with a smart contract. 1120 can include at least one of 1122 and 1124. At 1122, the method 1100 can determine that a public key is compatible with a smart contract. At 1124, the method 1100 can determine compatibility with a control structure of a smart contract. The method 1100 can then continue to 1130.

At 1130, the method 1100 can modify operation of an entry controller. 1130 can include at least one of 1132 and 1134. At 1132, the method 1100 can transmit at least one instruction to modify operation of an entry controller based on a second NFT. For example, the method 1100 can include causing the entry controller can validate an entry key based on the NFT to permit entry to the physical environment, the instruction including the entry key. At 1134, the method 1100 can modify operation of an entry controller to permit entry to a physical environment. For example, the entry controller can restrict entry to the physical environment during a predetermined time.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A system to generate and validate non-fungible tokens (NFTs) linked with physical environments, the system comprising:
   memory and one or more processors to:
   obtain, from a device corresponding to a user, a location parameter including location data identifying a physical location of the device;
   obtain, from the device in response to a determination that the location data identifying the physical location of the device corresponds to a physical environment, a public key of the user;
   generate, based on the public key and a private key of the user, a non-fungible token (NFT) linked with the user and the physical environment;
   determine, in response to a determination that the device satisfies a distance threshold to an entry controller at the physical environment, that the NFT and the public key are compatible with a control structure of a smart contract;
   transmit, in response to the determination that that the NFT and the public key are compatible with the control structure of the smart contract, an instruction based on the NFT to modify operation of the entry controller to permit entry to the physical environment;
   generate, in response to the determination that that the NFT and the public key are compatible with the control structure of the smart contract, a second NFT linked with a second physical environment; and
   generate, based on the public key and the private key of the user, the control structure including a container configured to encapsulate the NFT and the second NFT, wherein the container restricts access to the NFT and the second NFT based on the determination of whether an obtained private key is compatible with the container.

2. The system of claim 1, the data processing system to:
   generate, based on the public key and the physical environment, the smart contract and the control structure compatible with the NFT, the user, and the physical environment.

3. The system of claim 1, the NFT comprising an environment parameter corresponding to a characteristic of the physical environment.

4. The system of claim 1, the NFT comprising a user parameter corresponding to a characteristic of the user.

5. The system of claim 1, the data processing system to:
   generate, based on the public key and a private key of the user, the control structure to restrict entry to a predetermined portion of the physical environment.

6. The system of claim 1, the data processing system to:
   cause the entry controller to validate an entry key based on the NFT to permit entry to the physical environment, the instruction including the entry key.

7. The system of claim 1, the entry controller operable to restrict entry to the physical environment during a predetermined time.

8. A system to generate and validate non-fungible tokens (NFTs) linked with physical environments, the system comprising:

memory and one or more processors to:

obtain, from a device corresponding to a user, a location parameter including location data identifying a physical location of the device;

obtain, from the device in response to a determination that the location data identifying the physical location of the device corresponds to a physical environment, a public key of the user;

generate, based on the public key and a private key of the user, a non-fungible token (NFT) linked with the user and the physical environment;

determine, in response to a determination that the device satisfies a distance threshold to an entry controller at the physical environment, that the NFT and the public key are compatible with a control structure of a smart contract;

transmit, in response to the determination that that the NFT and the public key are compatible with the control structure of the smart contract, an instruction based on the NFT to modify operation of the entry controller to permit entry to the physical environment;

generate, in response to the determination that that the NFT and the public key are compatible with the control structure of the smart contract, a second NFT linked with a second physical environment; and generate, based on the public key and the private key of the user, the control structure including a container configured to encapsulate the NFT and the second NFT, wherein the container restricts access to the NFT and the second NFT based on the determination of whether an obtained private key is compatible with the container.

9. The method of claim 8, further comprising:

generating, based on the public key and the physical environment, the smart contract and the control structure compatible with the NFT, the user, and the physical environment.

10. The method of claim 8, the NFT comprising an environment parameter corresponding to a characteristic of the physical environment.

11. The method of claim 8, the NFT comprising a user parameter corresponding to a characteristic of the user.

12. The method of claim 8, further comprising:

generating, based on the public key and a private key of the user, the control structure to restrict entry to a predetermined portion of the physical environment.

13. The method of claim 8, further comprising:

causing the entry controller to validate an entry key based on the NFT to permit entry to the physical environment, the instruction including the entry key.

14. The method of claim 8, the entry controller operable to restrict entry to the physical environment during a predetermined time.

15. A non-transitory computer readable medium including one or more instructions stored thereon and executable by a processor to:

obtain, by the processor from a device corresponding to a user, a location parameter including location data identifying a physical location of the device;

obtain, by the processor from the device in response to a determination that the location data identifying the physical location of the device corresponds to a physical environment, a public key of the user;

generate, by the processor based on the public key and a private key of the user, a non-fungible token (NFT) linked with the user and the physical environment;

determine, by the processor in response to a determination that the device satisfies a distance threshold to an entry controller at the physical environment, that the NFT and the public key are compatible with a control structure of a smart contract;

transmit, by the processor in response to the determination that that the NFT and the public key are compatible with the control structure of the smart contract, an instruction based on the NFT to modify operation of the entry controller to permit entry to the physical environment;

generate, in response to the determination that that the NFT and the public key are compatible with the control structure of the smart contract, a second NFT linked with a second physical environment; and generate, based on the public key and the private key of the user, the control structure including a container configured to encapsulate the NFT and the second NFT, wherein the container restricts access to the NFT and the second NFT based on the determination of whether an obtained private key is compatible with the container.

16. The non-transitory computer readable medium of claim 15, wherein the non-transitory computer readable medium further includes one or more instructions executable by the processor to:

generate, based on the public key and the physical environment, the smart contract and the control structure compatible with the NFT, the user, and the physical environment.

* * * * *